(12) United States Patent
Westerinen et al.

(10) Patent No.: US 8,099,324 B2
(45) Date of Patent: Jan. 17, 2012

(54) SECURELY PROVIDING ADVERTISING SUBSIDIZED COMPUTER USAGE

(75) Inventors: William J. Westerinen, Issaquah, WA (US); Hanumant Kumar Yadav, Issaquah, WA (US); James S. Duffus, Seattle, WA (US); Todd L. Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 11/765,571

(22) Filed: Jun. 20, 2007

(65) Prior Publication Data

US 2007/0244820 A1    Oct. 18, 2007

Related U.S. Application Data

(63) Continuation-in-part of application No. 11/092,041, filed on Mar. 29, 2005, now Pat. No. 7,669,056.

(51) Int. Cl.
*G06F 21/00* (2006.01)

(52) U.S. Cl. .................... 705/14.47; 705/51; 705/14.48; 705/14.49; 705/14.52; 705/67; 713/182; 713/185; 713/189; 713/193; 713/194; 455/410; 455/412.1; 726/16; 726/17; 726/20; 726/27; 726/30

(58) Field of Classification Search ................ 705/1, 52, 705/59, 14.1, 14.11, 14.13, 14.37, 14.47, 705/14.27, 14.4, 14.52; 726/16, 17, 20, 27, 726/30; 713/182, 185, 189, 193, 194; 455/410, 455/412.1

See application file for complete search history.

(56) References Cited

U.S. PATENT DOCUMENTS

| | | | | | |
|---|---|---|---|---|---|
| 5,023,907 | A | * | 6/1991 | Johnson et al. | 710/200 |
| 5,150,420 | A | * | 9/1992 | Haraguchi | 382/119 |
| 5,689,565 | A | * | 11/1997 | Spies et al. | 713/189 |
| 5,778,395 | A | * | 7/1998 | Whiting et al. | 707/204 |
| 5,881,144 | A | * | 3/1999 | Havens | 379/201.05 |
| 6,269,456 | B1 | * | 7/2001 | Hodges et al. | 714/38 |
| 6,450,407 | B1 | * | 9/2002 | Freeman et al. | 235/492 |
| 6,505,773 | B1 | * | 1/2003 | Palmer et al. | 235/380 |
| 6,510,513 | B1 | * | 1/2003 | Danieli | 713/156 |
| 6,698,020 | B1 | * | 2/2004 | Zigmond et al. | 725/34 |
| 6,820,063 | B1 | * | 11/2004 | England et al. | 705/54 |
| 6,837,427 | B2 | * | 1/2005 | Overhultz et al. | 235/382 |
| 6,856,800 | B1 | * | 2/2005 | Henry et al. | 455/411 |
| 6,959,384 | B1 | * | 10/2005 | Serret-Avila | 713/176 |
| 6,974,076 | B1 | * | 12/2005 | Siegel | 235/380 |

(Continued)

FOREIGN PATENT DOCUMENTS

KR    20060028463 A    3/2006

(Continued)

OTHER PUBLICATIONS

Written Opinion for PCT/US2008/067466 mailed Dec. 26, 2008.

(Continued)

*Primary Examiner* — Mamon Obeid

(57) ABSTRACT

A method and apparatus for assuring delivery of paid advertising to a user may involve asking a question about an advertisement or requiring data about the advertisement to be entered. In one embodiment, a human presence indicator, such as stylized letters, may be displayed during or after the presentation of an advertisement to be copied by a user to indicate presence during the advertisement. When the challenge relating to ad viewing is correctly answered, a value associated with viewing the ad may be credited to a user account, either locally or at a clearinghouse or other repository.

10 Claims, 5 Drawing Sheets

U.S. PATENT DOCUMENTS

| | | | | |
|---|---|---|---|---|
| 7,013,286 | B1* | 3/2006 | Aggarwal et al. | 705/14.26 |
| 7,055,031 | B2* | 5/2006 | Platt | 713/168 |
| 7,124,115 | B1* | 10/2006 | Herzberg et al. | 705/64 |
| 7,174,457 | B1* | 2/2007 | England et al. | 713/168 |
| 7,194,092 | B1* | 3/2007 | England et al. | 380/262 |
| 7,219,071 | B2* | 5/2007 | Gallagher | 705/14.14 |
| 7,234,638 | B2* | 6/2007 | Lee et al. | 235/380 |
| 7,269,846 | B2* | 9/2007 | Chennakeshu et al. | 726/4 |
| 7,284,124 | B1* | 10/2007 | Ginsberg | 713/167 |
| 7,302,709 | B2* | 11/2007 | England et al. | 726/27 |
| 7,306,143 | B2* | 12/2007 | Bonneau et al. | 235/380 |
| 7,353,267 | B1* | 4/2008 | Cunningham et al. | 709/224 |
| 7,356,682 | B2* | 4/2008 | Lampson et al. | 713/2 |
| 7,376,834 | B2* | 5/2008 | Edwards et al. | 713/168 |
| 7,444,509 | B2* | 10/2008 | Nadalin et al. | 713/156 |
| 7,447,303 | B1* | 11/2008 | Moneymaker | 379/207.13 |
| 7,506,053 | B1* | 3/2009 | Qin | 709/225 |
| 7,568,211 | B2* | 7/2009 | Mai et al. | 725/35 |
| 7,571,488 | B2* | 8/2009 | Oho et al. | 726/27 |
| 7,584,149 | B1* | 9/2009 | Bishop et al. | 705/51 |
| 7,610,486 | B2* | 10/2009 | Herrmann et al. | 713/168 |
| 7,613,599 | B2* | 11/2009 | Bade et al. | 703/14 |
| 7,634,661 | B2* | 12/2009 | England et al. | 713/176 |
| 2002/0007314 | A1* | 1/2002 | Maruyama | 705/14 |
| 2002/0046098 | A1* | 4/2002 | Maggio | 705/14 |
| 2002/0107809 | A1* | 8/2002 | Biddle et al. | 705/59 |
| 2003/0014673 | A1* | 1/2003 | Baum et al. | 713/202 |
| 2003/0018969 | A1* | 1/2003 | Humpleman et al. | 725/34 |
| 2003/0033543 | A1* | 2/2003 | Hubbard et al. | 713/201 |
| 2003/0050831 | A1* | 3/2003 | Klayh | 705/14 |
| 2003/0236756 | A1* | 12/2003 | Humpleman et al. | 705/76 |
| 2005/0080801 | A1* | 4/2005 | Kothandaraman et al. | 707/100 |
| 2005/0144073 | A1* | 6/2005 | Morrisroe et al. | 705/14 |
| 2005/0149723 | A1* | 7/2005 | Watkins et al. | 713/156 |
| 2005/0216346 | A1* | 9/2005 | Kusumoto et al. | 705/14 |
| 2006/0026569 | A1* | 2/2006 | Oerting et al. | 717/126 |
| 2006/0041754 | A1* | 2/2006 | Hind et al. | 713/176 |
| 2006/0101155 | A1* | 5/2006 | Damour et al. | 709/238 |
| 2006/0212350 | A1* | 9/2006 | Ellis et al. | 705/14 |
| 2006/0227364 | A1* | 10/2006 | Frank et al. | 358/1.15 |
| 2006/0265493 | A1* | 11/2006 | Brindley et al. | 709/224 |
| 2006/0265508 | A1* | 11/2006 | Angel et al. | 709/230 |
| 2007/0106521 | A1* | 5/2007 | Ho et al. | 705/1 |
| 2007/0214043 | A1* | 9/2007 | Yasuda | 705/14 |
| 2008/0021909 | A1* | 1/2008 | Black et al. | 707/100 |
| 2008/0254883 | A1* | 10/2008 | Patel et al. | 463/31 |
| 2008/0307495 | A1* | 12/2008 | Holtzman et al. | 726/2 |

FOREIGN PATENT DOCUMENTS

KR    20060103035 A    9/2006

OTHER PUBLICATIONS

International Search Report for PCT/US2008/067466 mailed Dec. 26, 2008.

* cited by examiner

US 8,099,324 B2

SECURELY PROVIDING ADVERTISING SUBSIDIZED COMPUTER USAGE

This application is a continuation-in-part of U.S. patent application Ser. No. 11/092,041, publication number 20060227364, filed Mar. 29, 2005 now U.S. Pat. No. 7,669,056, which is incorporated by reference for all purposes.

BACKGROUND

Advertisers, tool suppliers, search engines, etc. are willing to compensate users for viewing ads or using tool bars or menu bars. Verification of actual use or display of the underwritten content can be difficult and fraud prone. Simply sending data to an electronic device does not guarantee consumption. Some techniques require sending data back to a server to verify consumption of the underwritten content. This can be difficult in developing areas where network access may be limited and frustrating to users who want an immediate and measurable result from viewing or using underwritten content.

SUMMARY

A security module in an electronic device may use direct access to display memory to verify that underwritten content is being displayed. To accomplish this, an ad server or intermediate processing point may select all or a portion of displayable data and take a first measurement of the displayable data. In one embodiment, the measurement may be a hash of the ad or portion. The ad and the measurement, including metadata about the measurement process, may be downloaded to an electronic device, such as a pay-per-use computer. When the ad data is reported to be displayed, the security module may read the display memory and copy the ad or portion to the security module where the original measurement may be repeated. If the first and second measurements match, a value packet representing the value associated with display of the displayable data may be immediately added to a local value account.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
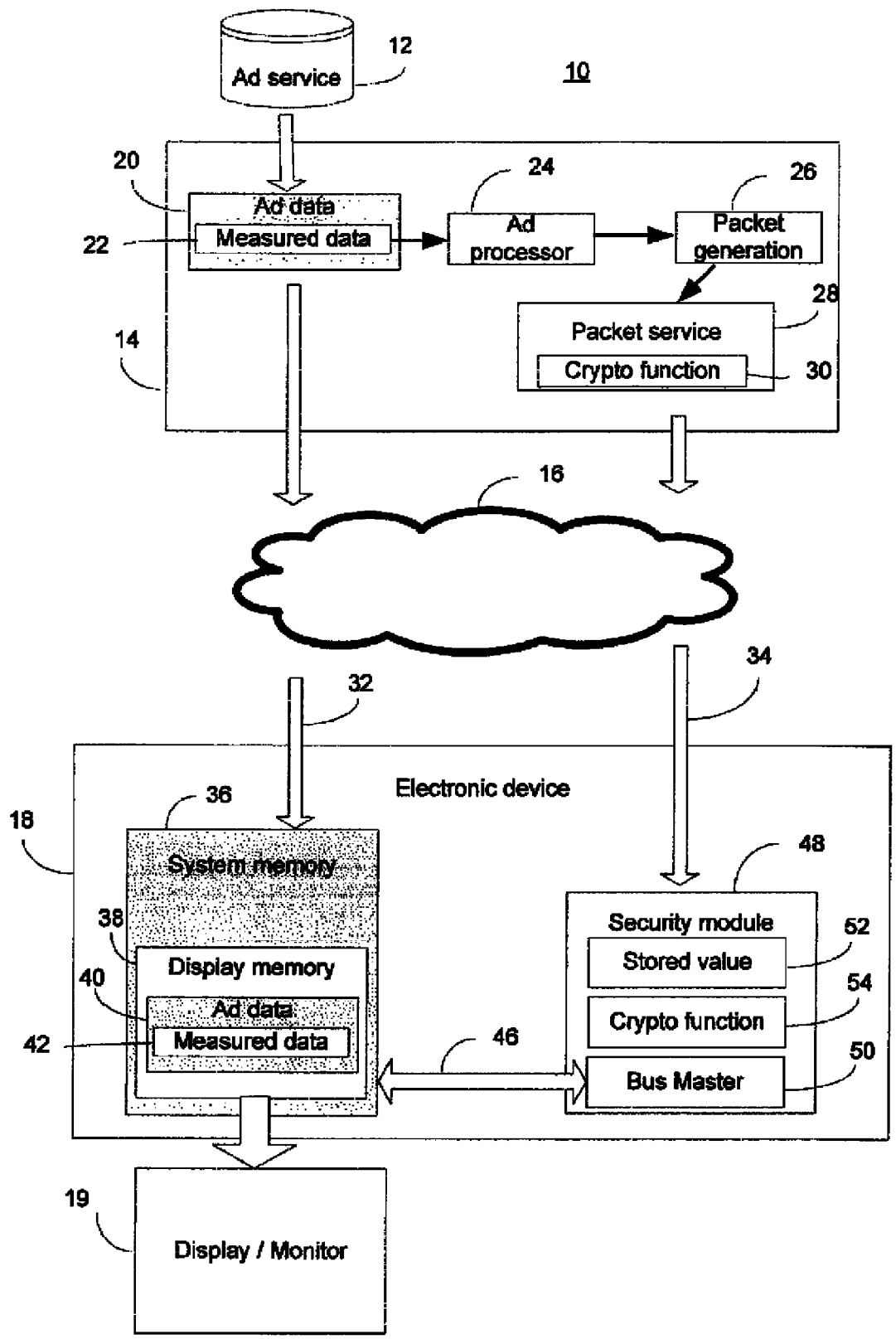
FIG. 1 is a simplified and representative block diagram of a system for delivering and verifying presentation of sponsored content on an electronic device.

FIG. 1 is a block diagram illustrating a system 10 for verifying display of a graphical information and, when called for, compensating a user for the display of the graphical information. The graphical information may be an advertisement, a menu or tool bar, a video, a picture, a bitmap, a text object with additional data. The methods and apparatus described below are effective on virtually any displayable data. For the purpose of illustration, the description following will use an advertisement with graphical information as an example but does not limit the claims to an advertisement. The display of graphics information of any type may be of value to an underwriter or sponsor and may even part of a business model. When value, such as usage time or even currency is involved, a tamper-resistant verification mechanism for determining when the graphics information has been displayed may be the difference between the success or failure of the business model. Other embodiments may not be limited to graphical information, but may include any presentation data that is stored in memory while being presented, including, but not limited to, audio data such as an MP3 containing sponsored content.

An advertising server 12 may serve an advertisement 20 to an intermediate service 14 using a communication interface inherent to the advertising server 12. Alternatively, the advertising service 12 and the intermediate service 14 may be the same entity and may even be hosted on the same physical device, such as a server. When separate, the advertising server 12 may include a routing function that directs the advertisement 20 to the intermediary service 14 even though the ultimate target is an electronic device 18. The intermediate service 14 may extract and process data from the ad 20 and forward the ad 20 through a network 16 to the electronic device 18. The electronic device 18 may display a graphical component of the ad 20 on a display 19. Any number of display types may be supported. For example, if the electronic device 18 is a computer, graphical output may be to a CRT or LCD monitor. When the electronic device 18 is a cellular telephone, personal organizer, etc. graphical output may be to a display integral with the electronic device 18.

Looking at the major components in more detail, the intermediate server 14 may include an advertisement processor 24 that takes the advertisement 20 and identifies a measured portion 22 that may be all or a portion of the advertisement 20. The measured portion 22 may be processed into a result, such as a hash, or may be kept in tact. In some cases, the measured portion 22 may be a particular feature, such as a digital watermark or steganographic information. When the ad 20 is served real time, such as during a browsing session, destination information (not depicted) may be included in the advertisement 20 or a data packet (not depicted) containing the advertisement 20. The measured portion 22, raw or processed, may be sent to a packet generator 26 for incorporation into a packet for distribution to the electronic device 18. If less than the whole advertisement is measured, metadata may be created that indicates what portion of the advertisement 20 was measured. If a credit is to be applied at the electronic device 18 when the advertisement 20 is displayed, the packet generator may further incorporate information that can be used by the electronic device 18 to update a local value account, for example, a packet used for provisioning.

The packet, when finally constructed, may include a.) the results of the measurement, b.) metadata pointing to the portion of the advertisement 20 measured, and c.) provisioning information related to credits to be added to a local value account upon verification of the display of the ad 20. A cryptographic function 30 may operate on the generated packet to encrypt, sign, or both. A packet service 28 may forward the packet to the electronic device 18 and may be responsible for assuring once and only once delivery of the packet.

The ad 20 may be sent via data path 32, while the packet may be sent over the same connection 32 or a different connection 34, or even in the same transmission. The two are shown separate to indicate that they may be logically separated, with the ad 20 addressed to a browser process on the electronic device 18, while the packet may be addressed to a security module 48 in the electronic device 18.

Within the electronic device 18, a system memory 36 may incorporate memory allocated as display memory 38. This may be the case if a unified memory architecture (UMA) is used. Other architectures may have physically separate memories for the display memory 38, such as, in a video card.

When the ad 20 is being displayed, its binary image 40 and any measured portion 42 will be present in the display memory 38. A security module 48 may incorporate a bus master function 50, capable of accessing and controlling the system bus 46. Using metadata incorporated in the packet, the security module 48 may take control of the system bus 46 for a timed interval to directly read the contents of the display memory 38, or at least the measured portion 42. In one embodiment, the system bus is a peripheral component interconnect (PCI) bus.

The security module 48 may also include a stored value function 52. The stored value function 52 may store value used to pay for usage of the computer, pay for application usage, network connection time, etc. In some embodiments, the stored value may be used similar to currency or points for purchase of goods or services.

The cryptographic function 54 may be used to decrypt, authenticate a signature, or both. For example, when a packet related to an advertisement 20 is received, it may be signed or encrypted, to ensure authenticity and integrity since a fraudulent packet could lead to giving improper credit when an advertisement is displayed. The security module is discussed in more detail below with respect to FIG. 3.

A side effect of the verification process used to convert the display of sponsored content on the electronic device 18 into local value is that the electronic device 18 becomes bound to the intermediary service 14. That is, only intermediary services, such as service 14, for which the security module 48 has keys will be able to decode and use value packets associated with viewing of the content. Because the keys may be tied to an underwriter, this assures the underwriter that ad-based revenue will flow through an authorized channel and not via a rogue channel.

Figure 2:
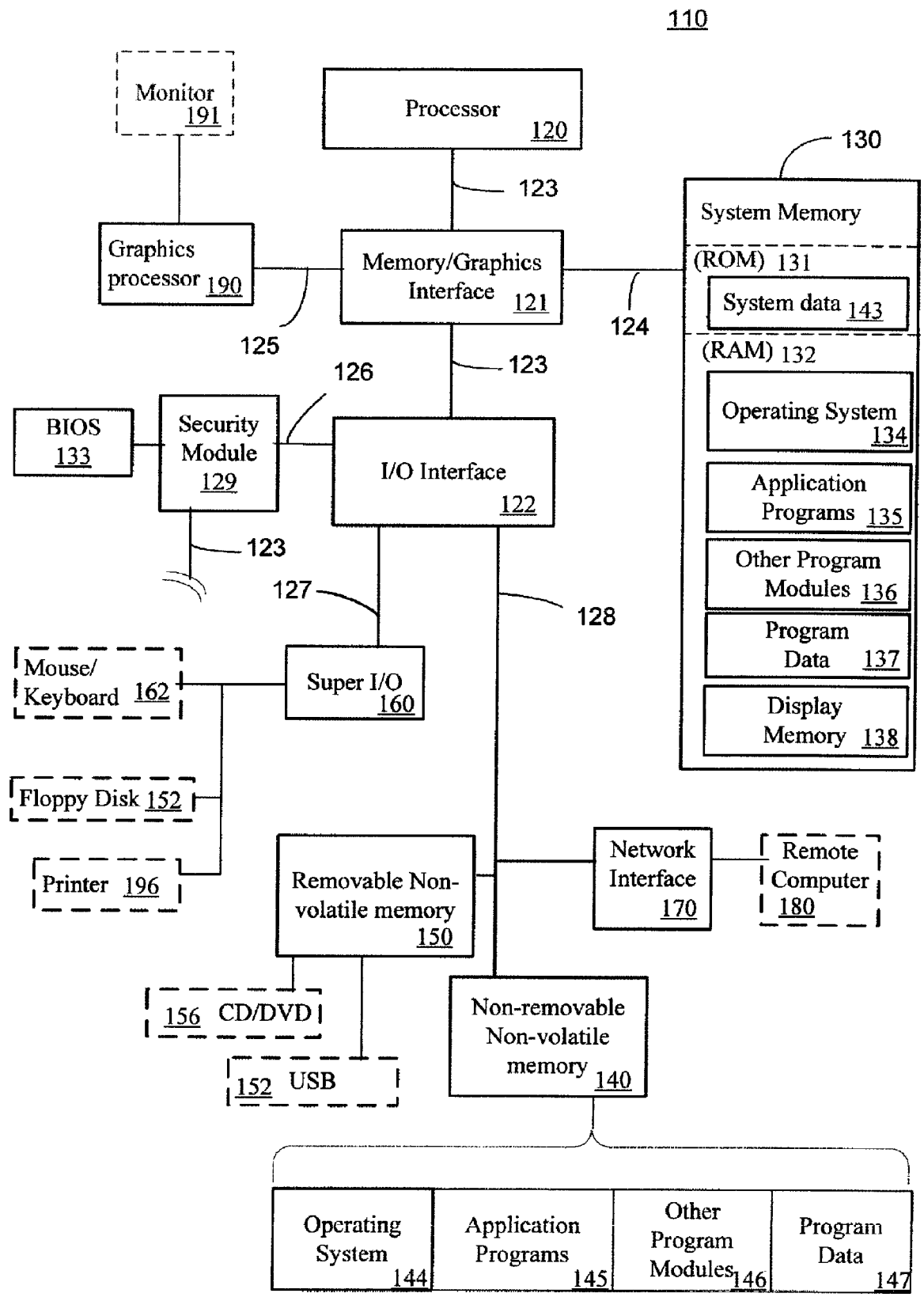
FIG. 2 is a block diagram of a representative electronic device of FIG. 1.

With reference to FIG. 2, an exemplary electronic device for implementing the claimed method and apparatus may include a general purpose computing device in the form of a computer 110. Components shown in dashed outline are not technically part of the computer 110, but are used to illustrate the exemplary embodiment of FIG. 2. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology. CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 2 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up. In some embodiments, a security module 129 may reside on the SPI bus 126. The security module 129 may manage pay-per-use operation, provide secure storage, or control the boot process by managing if the BIOS 133 is used to boot the computer 110, or an alternate boot memory stored in the security module 129. The security module may also have a PCI bus connection 123 that allows the security module 129 to participate on, or in some cases control, the PCI bus 123. The security module 129 is discussed in more detail below with respect to FIG. 3.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 2 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 110. In FIG. 2, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The NIC 170 may serve as a port for sending and receiving data with host computers, such as an advertising service 12 of FIG. 1. The logical connection between the NIC 170 and the remote computer 180 depicted in FIG. 2 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communication link between the computers may be used.

Figure 3:
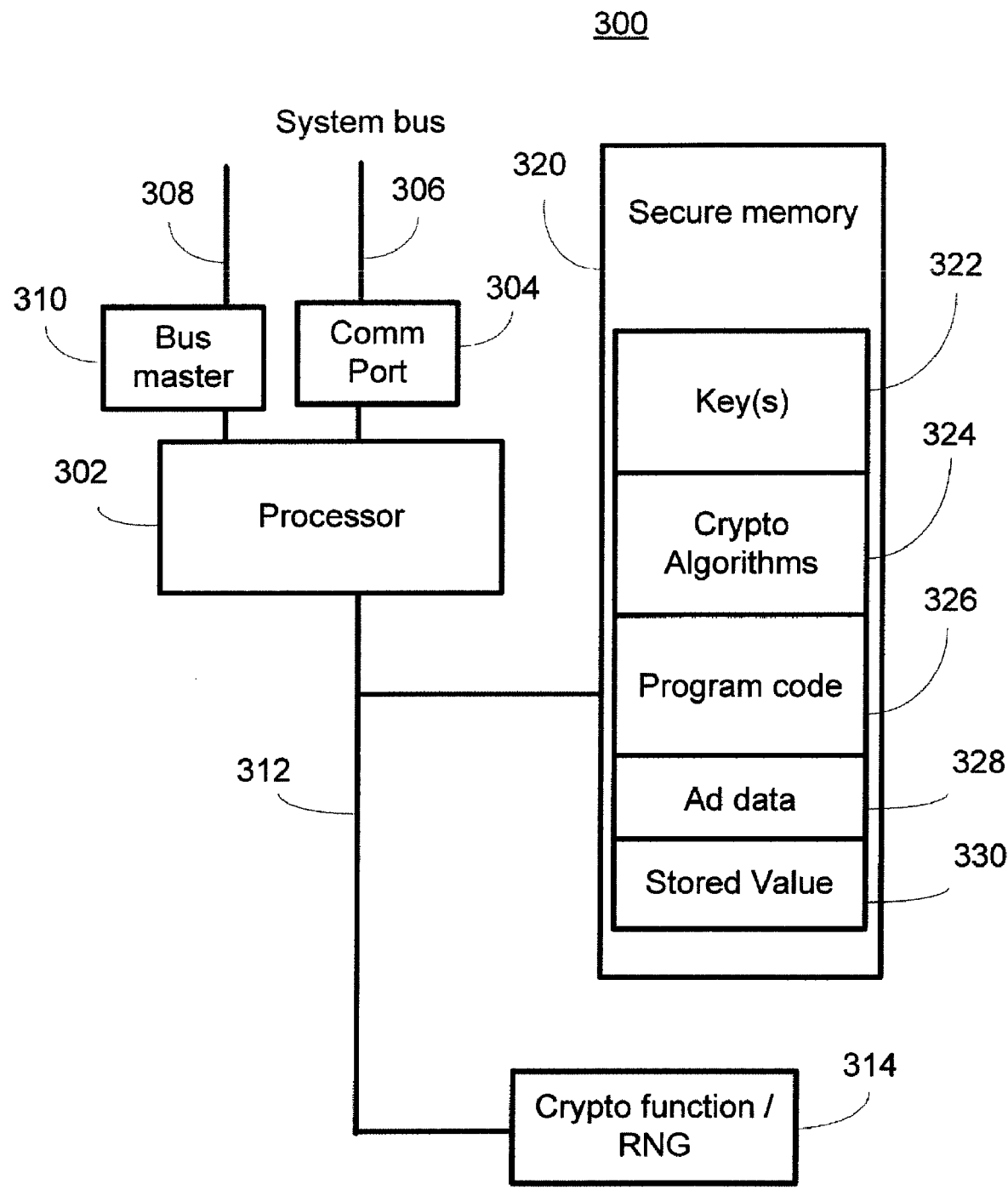
FIG. 3 is a block diagram of a security module.

FIG. 3 is a block diagram of a representative security module 300, such as the security module 48 of FIG. 1 or security module 129 of FIG. 2. The security module 300 may be used to validate advertisements, but may also be used to measure and manage pay-per-use time or subscription terms for a metered-user computer, such as computer 110 of FIG. 2. The security module 300 may include a module processor 302. The module processor 302 may be a part of single chip processor or may be a processor core, such as an ARM® core from ARM Ltd. The processor may be connected to external circuitry by a communication port 304 coupled to a bus 306. The bus 306 may be, in some exemplary embodiments, an SPI bus connected to an I/O interface sometimes called a Southbridge chip. The module processor 302, in addition to or instead of the connection to bus 306, may be connected to a second bus 308, such as a PCI bus or other internal data bus. The module processor 302 may use a bus master 310 to couple to the second bus 308. The bus master 310 may allow control of the second bus 308, allowing the security module 300 to take over the second bus 308 to directly interact with any other component on the second bus 308 without intervention from a system main processor, such as processor 120 of FIG. 2. One advantage of direct interaction between the security module 300 and another component is that rogue or malicious processor code will not have an opportunity to alter data requested by the security module 300 via a normal programmatic process.

The security module 300 may also include an internal bus 312 coupled to a cryptographic function 314 and a secure memory 320. The crypto function 314 may also include a random number generator and can provide cryptographic capabilities for use in encryption, decryption, and signature processing. The cryptographic function 314 may support public key infrastructure processing, symmetric key processing, or both. In other embodiments, a hardware cryptographic function 314 may be replaced or supplemented by cryptographic algorithms 324 implementing software cryptographic functions.

The secure memory 320, in addition to cryptographic algorithms 324, may store cryptographic keys 322, program code 326, advertising data 328, and stored value 330. The program code 326 may include both executable instructions for the processor 302 and code, such as an alternate BIOS, for use by the main system processor, such as processor 120 of FIG. 2.

The advertising data 328 may be measurement and metadata related to a currently displayed advertisement, such as ad 40 of FIG. 1. Alternatively, the advertising data 328 may include a block of measurement and metadata corresponding to a plurality of ads either already queued to the electronic device 18 or likely to be sent to the electronic device 18.

The stored value 330 may be currency, minutes, or a subscription expiration date. In any case, the stored value 330 has value to a user/owner of the electronic device 18 in the form of future use of the electronic device 18 or for purchase of goods or services.

Figure 4:
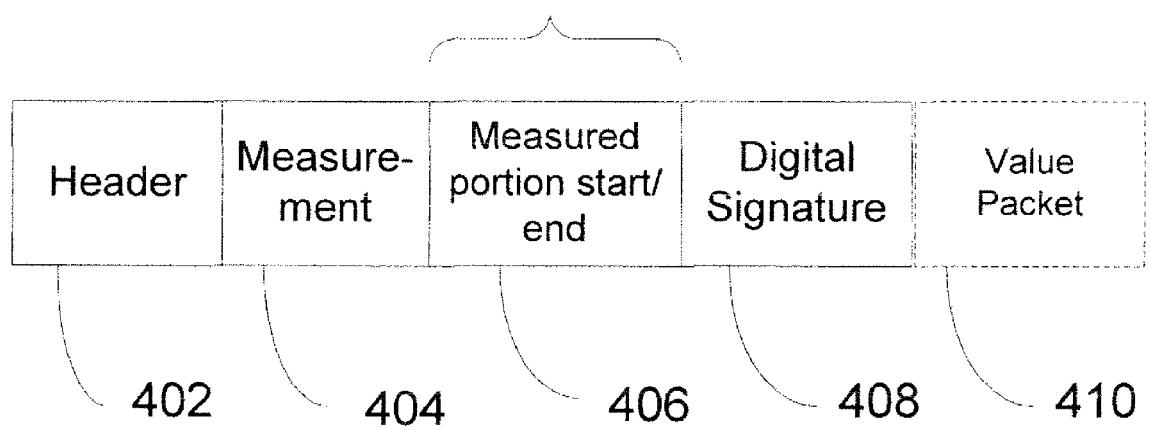
FIG. 4 is a representative layout of a packet sent to the electronic device of FIG. 1.

FIG. 4 illustrates a representative packet 400 used to send ad data, metadata, and a value packet from an ad service 12 or intermediate service 14 to an electronic device 18. The packet 400 may include a header 402, advertisement measurement data 404, such sa a result of a cryptographic function, metadata 406 that may include address or offset/length data about the measure portion of an ad, such as ad 20 or 40 of FIG. 1. The measurement data 404 may be a hash of the ad, an encryption of raw data of the ad, or signed raw data from the ad. A digital signature 408 may be used to verify the authenticity and integrity of the packet 400. Optionally, a value packet 410 may be included. The value packet 410 may include secure data related to the amount to credit to be added to the stored value 330 of FIG. 3 upon verification of the presence of the ad 40 in the display memory 38.

Figure 5:
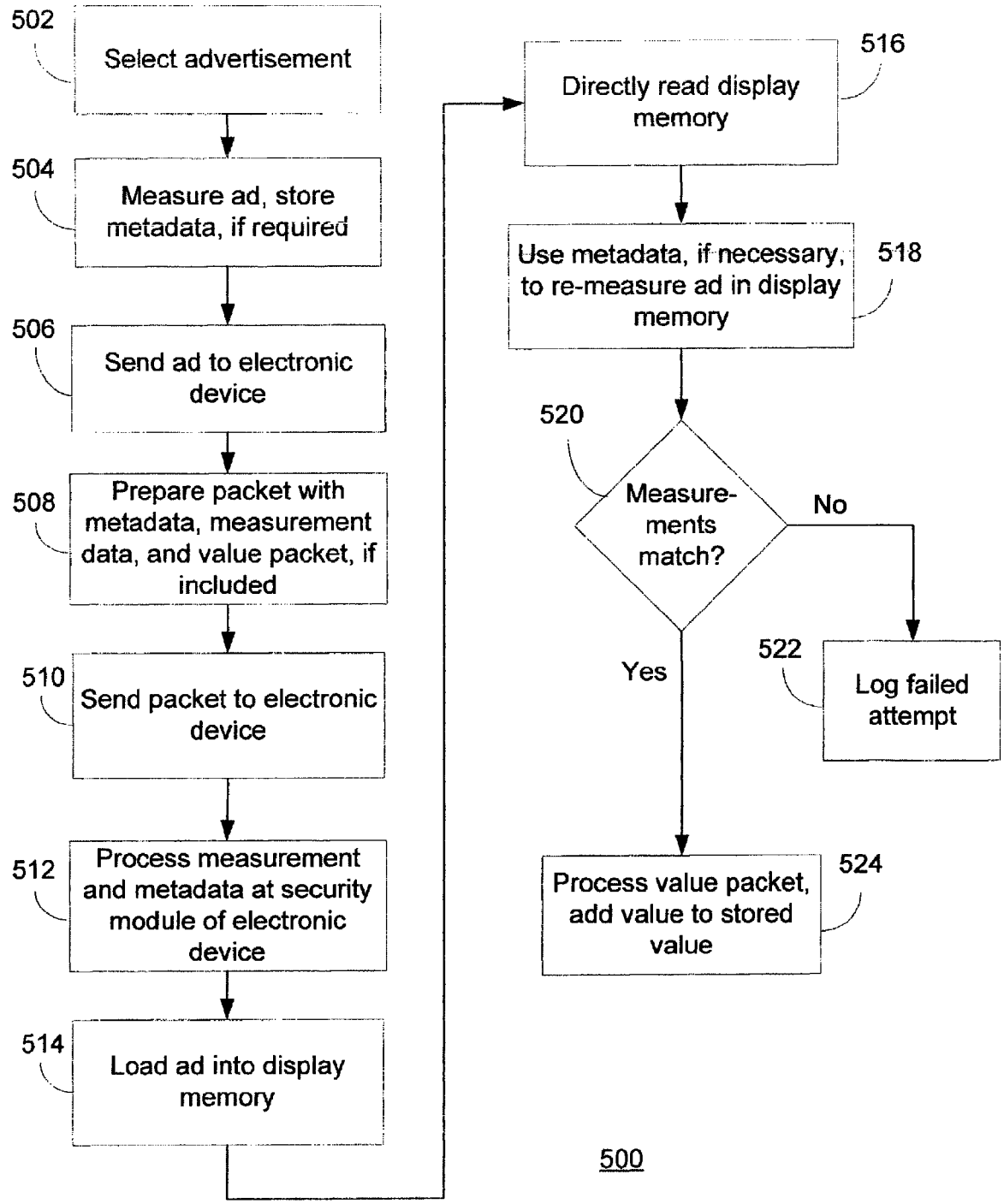
FIG. 5 is flow chart of a method of delivering and verifying presentation of sponsored content.

FIG. 5 is a flowchart depicted an exemplary method 500 of verifying display of an advertisement and applying credit to a local stored value account for such a display. At block 502, an advertisement 20 or other displayable data, such as a tool bar or menu bar, may be selected for delivery to an electronic device, such as electronic device 18 of FIG. 1. The selection may be responsive to query data such as key words used in a search. Alternatively, the advertisement may be selected based on advertising from a sponsor or underwriter of a pay-per-use business model for delivery of the electronic device 18 to a user. At block 504, the ad 20 may be measured, such as taking a cryptographic hash of the full ad 20 or a portion 22 of the ad 20. The measurement or cryptographic result may be a digital watermark or steganographic information embedded in the ad 20. When a portion 22 of the ad 20 is measured, an ad processor 24 may develop metadata, such as metadata 406 of FIG. 4. The metadata 406 may define the portion 22 of the ad 20 over which the measurement was taken. The metadata 406 may be stored at block 504.

At block 406, the ad 20 may be sent to the electronic device 18 and stored in normal program memory, such as in system memory 36. At block 508, in no particular order with execution of block 506, a packet 400 may be prepared including the measurement data 404 corresponding to the ad 20, metadata 406, if needed, a digital signature 408, and a value packet 410 representing value associated with the ad 20. The value packet 410 may be the same as or similar to value packets sent when additional usage time, etc. is purchased for consumption by the electronic device 18. At block 510, the packet 400 may be sent to the electronic device 18. In some embodiments, a series of packets may be sent to the electronic device 18 in anticipation of sending multiple ads or streaming data to the electronic device 18. At block 512, the packet may be received at the electronic device 18 and the measurement data and metadata prepared for processing. Processing may include decrypting and verification of the signature using keys stored in the security module 48. The value packet may be stored for processing following verification of the display of the ad 20.

At block 514, the electronic device 18 may load the ad, shown as ad 40 in FIG. 1, into display memory 38. At block 516, a security module 48 may directly read the display memory to either capture the full ad 40 or the portion 42 over which the first measurement was made. The measurement may be taken in response to a trigger signal from a main processor 120 of FIG. 1, indicating the ad 40 is present in display memory 38. The trigger signal may include an ad 40 identifier and a timing mark to allow the bus master 310 to take over the bus and read the display memory 38 without disturbing other processing. While the direct read without intervention of exact knowledge of the main processor 120 helps prevent fraudulent presentation of ad data, there is little motivation to hack the trigger signal since verification of the ad 40 is beneficial to the use.

At block 518, after the data is loaded into the security module 48, the measurement taken at block 504 may be repeated, using the metadata to identify the portion 42, if the whole of the ad 40 is loaded and is not required for the measurement. If keys are used to encrypt the ad 40 or portion 42, the key or keys 322 may be loaded from the secure memory 320 of the security module 300. After the second measurement data is generated, at block 520, the second measurement may be compared to the first measurement downloaded in the packet. In other embodiments, another criteria may be used, such as matching a given watermark or steganographic information. When the measurements match at block 520, the 'yes' branch may be followed to block 524 where the value packet may be processed and the value added to a locally maintained value account 330.

If, at block 520, the two measurements do not match, the 'no' branch may be followed to block 522. At block 522, the value packet will not be processed. Rather, data corresponding to the measurement may be logged to allow analysis for determination of a root cause for the failure.

The use of display data verification, be it streaming media, static advertisements, tool bars, menu bars, etc. allows users and underwriters alike to benefit from verified consumption of sponsored content. The security module allows local verification and immediate, viewable, credit applied to a local value account. High speed access to display memory by the security module limits exposure to fraud while allowing even streaming media to be verified. The technique is applicable with some variation to many different types and architectures of display memory, while complicating attempts to fraud the system because when data is in the display memory, the data is necessarily being displayed.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of verifying and compensating for consumption of advertising at an electronic device comprising:
    providing a displayable data;
    taking a cryptographic measure of at least a portion of the displayable data to create a first measurement of the displayable data;
    downloading the displayable data;
    downloading a packet comprising the first measurement corresponding to the at least a portion of the displayable data and a value packet;
    loading the displayable data into a display memory, wherein data in the display memory is presented on a display of the electronic device;
    presenting the displayable data on the display of the electronic device;
    taking a second cryptographic measurement of the at least a portion of the displayable data while the displayable data is in the display memory and being displayed to create a second measurement;
    comparing the first measurement to the second measurement;
    processing the value packet in response to determining that the first and second measurement match; and
    wherein processing the value packet comprises adding a value amount indicated in the value packet to a locally maintained stored value account.

2. The method of claim 1, wherein the first measurement is a hash of at least a portion of the displayable data.

3. The method of claim 1, wherein the first measurement comprises a digital watermark of the displayable data.

4. The method of claim 1, wherein downloading the packet comprises downloading the packet comprising the first measurement corresponding to the displayable data, the value packet, and metadata indicating a portion of the displayable data to which the first measurement pertains.

5. The method of claim 4, wherein loading the displayable data into the display memory comprises loading the displayable data into the display memory and providing the metadata to a security module for processing the display memory.

6. The method of claim 4, wherein processing the displayable data comprises reading the portion of the displayable data identified by the metadata.

7. The method of claim 1, further comprising:
    using, at a security module, a bus master function capable of accessing and controlling the system bus to read the display data in the display memory, wherein processing the displayable data comprises directly reading the displayable data at the security module without using a main processor of the electronic device while the displayable data is loaded in the display memory so that displayable data is presented on the screen of the electronic device.

8. The method of claim 1, wherein the displayable data is an advertisement.

9. The method of claim 1, wherein the displayable data is a menu bar.

10. The method of claim 1, wherein the downloading the packet comprises downloading the packet and cryptographically authenticating and decrypting the packet using a key or keys stored in a security module of the electronic device.

* * * * *